United States Patent [19]

Kuroda et al.

[11] Patent Number: 5,067,290
[45] Date of Patent: Nov. 26, 1991

[54] DAM RUBBER FOR CAR WINDOW AND ADHERED WINDOW STRUCTURE

[75] Inventors: Yasuhiro Kuroda; Hideo Suzuki, both of Osaka, Japan

[73] Assignee: Nitto Denko Corporation, Osaka, Japan

[21] Appl. No.: 459,237

[22] Filed: Dec. 29, 1989

[30] Foreign Application Priority Data

Apr. 14, 1989 [JP] Japan ................................. 1-96029

[51] Int. Cl.⁵ .......................... B60R 13/06; B60J 9/02
[52] U.S. Cl. ................................................ 52/208
[58] Field of Search .............. 52/208, 397, 309.6; 296/93; 49/475

[56] References Cited

U.S. PATENT DOCUMENTS

| | | | |
|---|---|---|---|
| 3,241,277 | 3/1966 | Coppock | 52/208 |
| 3,357,137 | 12/1967 | Lombardi | 52/309.6 |
| 3,413,389 | 11/1968 | Footner | 49/475 |
| 3,416,833 | 12/1968 | Griffin | 296/93 |
| 3,434,903 | 3/1969 | Hann | 296/93 |
| 4,419,844 | 12/1983 | Kreisfeld | 49/475 |
| 4,712,341 | 12/1987 | Harris | 52/208 |

FOREIGN PATENT DOCUMENTS

| | | |
|---|---|---|
| 0121480 | 10/1984 | European Pat. Off. . |
| 3124973 | 4/1982 | Fed. Rep. of Germany . |
| 3612923 | 10/1987 | Fed. Rep. of Germany . |

*Primary Examiner*—John E. Murtagh
*Attorney, Agent, or Firm*—Sughrue, Mion, Zinn, Macpeak & Seas

[57] ABSTRACT

A dam rubber for a car window having a spacer function and a structure of an adhered window using the same are disclosed. The dam rubber comprises a laminate of at least two open-cell foamed layers having different compressive resistances.

7 Claims, 1 Drawing Sheet

DAM RUBBER FOR CAR WINDOW AND ADHERED WINDOW STRUCTURE

FIELD OF THE INVENTION

The present invention relates to a dam rubber for a car window which comprises a laminate of foamed layers, and is superior in adaptability to gap variation, adaptability to corners, and gas permeability, and which serves as a spacer in fitting and fixing the window glass to the car body.

BACKGROUND OF THE INVENTION

In adhesion-fixation of a window glass to a supporting-frame such as a body flange, the window glass is provided with a dam rubber, and is adhesion-fixed to a supporting-frame so as to prevent an adhesive from leakage.

For the dam rubber, a laminate of stretchable dam rubber with an incompressible spacer has been proposed as described in JP-B-59-153615. (The term "JP-B" as used herein means an examined Japanese patent publication) Such a laminate, however, has the following disadvantages. That is, it has poor adaptability to variation of the gap between the window glass and the supporting-frame, thus becoming unnecessarily thick to cause distortion of other portions (such as formation of gaps between the supporting-frame and the molding), which brings defective adhesion, unfitness of the molding, and leakage of water. It also has poor flexibility to exhibit poor adaptability to corner, and thus complicating the work at the corner portion; and further has less tendency of air escape in application of an adhesive to make liable the formation of air entrapment, thus retarding the hardening of the adhesive or causing air inclusion resulting in water leakage.

SUMMARY OF THE INVENTION

An object of the present invention is to provide a dam rubber which offsets the above-mentioned disadvantages.

Other objects and effects of the present invention will be apparent from the following description.

According to an aspect of the present invention, there is provided a dam rubber for a car window having a spacer function and comprising a laminate of at least two open-cell foamed layers having different compressive resistances.

According to another aspect of the present invention, there is provided a structure of an adhered window, comprising a supporting-frame, a window glass fitted thereto by use of an adhesive, and a dam rubber for a car window therebetween in a compressed state, the dam rubber having a spacer function and comprising a laminate of at least two open-cell foamed layers having different compressive resistances.

DETAILED DESCRIPTION OF THE INVENTION

The laminate comprising layers having different compressive resistances, which constitutes the dam rubber of the present invention, is capable of adapting to significant variation of the gap between the window glass and the supporting-frame because of the highly compressible nature of a foamed layer having a low compression-resistance. Also, the laminate guarantees the gap precision between the window glass and the supporting-frame because of the function of less compressible nature of the other foamed layer having a high compressive resistance. Because the laminate has a continuous spacer-functioning portion of a uniform thickness (i.e., the foamed layer having a high compressive resistance), it prevents defective adhesion caused by non-uniform distribution of the spacer, and eliminates the individual determination of the position of arrangement of the spacer for each window, thus improving the efficiency of assembling operation. Additionally, the dam rubber disperses the load of the window glass to prevent stress concentration, thus exhibiting high cushioning ability because of the compressibility thereof. Moreover, the open-cell structure gives high flexibility and high gas permeability to the dam rubber, thus causing smooth hardening of the adhesive and facilitating escape of the air upon applying the adhesive.

The dam rubber for a car window of the present invention comprises a laminate of foamed layers having different compressive resistances, each foamed layer having open-cell foam structure. The proportion of the open-cell in the open-cell foam structure is preferably not less than 20% by volume, more preferably not less than 40% by volume. The number of the foamed layers of the laminate may be any number of not less than two layers, which may be determined suitably according to the size of the window to which the dam rubber is fitted, or other factors. For normal-sized cars, a two-layer structure is generally sufficient.

Figure 1:
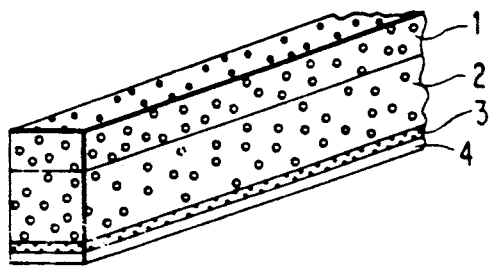
FIG. 1 is a perspective view of the dam rubber of the present invention.

FIG. 1 illustrates an example of a two-layer structure. The numeral 1 denotes a foamed layer having an open-cell structure of lower compressive resistance (low compression-resistant foamed layer); 2 denotes a foamed layer having an open-cell structure of higher compressive resistance (high compression-resistant foamed layer); 3 denotes a sticking layer for adhesion onto a window glass or a supporting-frame; 4 denotes a separator protecting the sticking layer before the adhesion. FIG. 1 illustrates the example in which the sticking layer is provided on the one side only, while, if necessary, sticking layers protected by separators may be provided on the both sides of the dam rubber so as to adhere the both of the window and the supporting-frame. Such adhesion to the both of the window and the supporting-frame will make surer the prevention of the leakage of the adhesive.

The compressive resistance for each of the foamed layers of the laminate may suitably be determined according to the size of the window to which the dam rubber is fitted, or other factors. In the case where the laminate is constituted of three or more layers, the compressive resistances for the respective layers may be different from each other or otherwise plurality of layers having the same compressive resistance may be employed. The top-and-bottom relation of the respective foamed layers is not restricted.

In application to normal-sized cars, the compressive resistance in terms of a compression load at 25% deflection of the low compression-resistant foamed layer is preferably from 10 to 300 g/cm², more preferably from 10 to 100 g/cm². The compressive resistance in terms of a compression load at 25% deflection of the high compression-resistant foamed layer is preferably higher by at least 30 g/cm² than that of the low compression-resistant layer, and is preferably from 40 to 800 g/cm², more preferably from 250 to 400 g/cm². In the case where three or more foamed layers having different compression resistance are employed, it is preferred that the compressive resistances for the foamed layers are respectively designed within the above-mentioned range for the low or high compression-resistant foamed layer.

The thickness of each foamed layer is not limited. Generally, the total thickness of the high compression-resistant foamed layers is preferably within the range of from 80 to 100% of the design value of the gap between the window glass and the supporting-frame for ensuring the function as a spacer thereof. In order to adapt to variation of the gap, the total thickness of the low compression-resistant foamed layer is preferably designed to give a compressive deformation of from 70 to 80% when the dam rubber is applied to the designed gap between the window glass and the supporting-frame. Such design usually brings a compressive deformation of from 30 to 40% for a larger gap between the window glass and the supporting-frame, and a compressive deformation of from 85 to 95% for a smaller gap, thus the layers are interposed between the window glass and the supporting-frame so as to fill in the gaps between them. The total thickness of the low compression-resistant foamed layers is generally from 1 to 3 mm, and that of the high compression-resistant foamed layer is generally from 3 to 6 mm. From the standpoint of handling such as smooth application without torsion of the dam rubber between the window glass and the supporting-frame, the total thickness of the high compression resistant foamed layer is preferably at least 50%, more preferably from 50 to 75%, of the total thickness of the layers.

The shape of the section of the dam rubber for a car window of the present invention is usually rectangular, but may be designed suitably.

The dam rubber for a car window may be prepared, for example, by adhering and laminating rubber foamed article (such as ethylene-propylene-diene terpolymers, chloroprene, etc.) and/or plastic foamed articles (such as polyurethane, polyethlene, polyvinyl chloride, etc.) of an open-cell structure having the above-mentioned proportions of open-cells, and having different compressive resistances. The lamination is carried out, for example, by partial application of an adhesive so that gas permeability of the dam rubber may be maintained. The sticking layer may be provided, for example, by spreading a sticking agent (such as acrylic sticking agents, natural or synthetic rubber sticking agents, etc.) on a separator to form a sticking layer, and adhering it onto the above-mentioned laminate.

The present invention will be described in more detail referring to the following example, but the present invention is not construed as being limited thereto.

EXAMPLE

Figure 2:
FIG. 2, FIG. 3, and FIG. 4 illustrate application states of the dam rubber of the present invention.

A dam rubber having a width of 5 mm and a thickness of 9 mm for a car window was prepared which is composed of a low compression-resistant open-cell foamed layer made of polyurethane having a compressive resistance in terms of a compression load at 25% deflection of about 100 g/cm² and a thickness of 3 mm; a high compression-resistant open-cell foamed layer made of polyurethane having a compressive resistance in terms of a compression load at 25% deflection of 230 g/cm² and a thickness of 6 mm; and an acrylic sticking agent layer on one surface. As shown in FIG. 2, the dam rubber was adhered through the acrylic adhesive layer onto the periphery of wind-shield glass 5 for a normal-sized car with provision of a margin 51 for an adhesive having a width of 7 mm from the edge. A urethane type adhesive was applied on to the margin 51, and the windshield glass was fitted onto the supporting-frame 7 as shown in FIG. 4.

With the above-described dam rubber, the adhesive became hardened in 6 hours which was one third of the hardening time of the case using a conventional dam rubber, and neither air entrapment therein nor water leakage in a shower test were observed. After the assemblage, the precision of the gap between the windshield glass and the supporting-frame was within the range of 6.2±0.2 mm for the design value of 6.2 mm. The above-mentioned dam rubber having a thickness of 9 mm compressed to 6.2 mm had an air permeability of 10 cc/cm³·sec.

Figure 3:
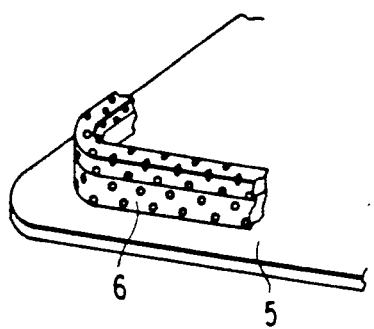

The dam rubber 6, as shown in FIG. 3, exhibited satisfactory adaptability to corner in adhesion to the windshield glass 5 without causing peeling-off or separation at the corner portion.

Figure 4:
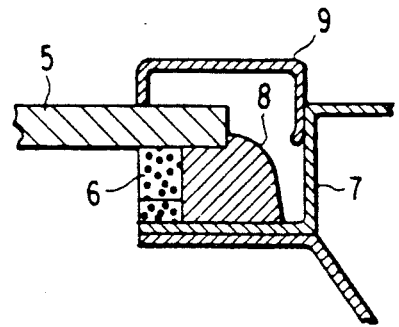

As shown in FIG. 4, the dam rubber for a car window 6 could be compressed without bulging out, so that the field of view of the windshield glass 5 was not reduced. The adhesion area for the adhesive 8 could be secured effectively without requiring excessive amount of coating of the adhesive, and without staining the surrounding portion. The molding 9 could be fitted satisfactory.

The dam rubber for a car window of the present invention is highly compressible, flexible, and air-permeable because of the lamination construction of open-cell foamed layers having different compressive resistance. Consequently, the dam rubber has a high adaptability to variation of the gap between the window glass and the supporting-frame, and exhibits satisfactory spacer function of thickness uniformity to give sufficient fitting of the molding. The dam rubber is sufficiently flexible, and exhibits good adaptability to corners to facilitate the working at the corner portion. The adhesive hardens smoothly to give a high working efficiency because of the high air-permeability. Air does not tend to be entrapped so that defective adhesion is not likely to occur, and that the necessary adhesion area can be secured with a small amount of an adhesive to give a car window of large view field. Further, the load of the window glass can be distributed to avoid a stress concentration, giving sufficient cushioning property.

While the invention has been described in detail and with reference to specific examples thereof, it will be apparent to one skilled in the art that various changes and modifications can be made therein without departing from the spirit and scope thereof.

What is claimed is:

1. A dam rubber for adhesive fixation of a car window having a spacing function, said dam rubber consisting essentially of:
   a laminate of at least two highly flexible, gas permeable open cell foamed layers having different compressive resistances that facilitate the escape of air as adhesive is applied to permit smooth hardening of adhesive.

2. A dam rubber as claimed in claim 1, wherein a difference between compressive resistance in terms of a compression load at 25% deflection of a first open-cell foamed layer having lower compressive resistance and a second open-cell foamed layer having higher compressive resistance is at least 30 g/cm².

3. A dam rubber as claimed in claim 2, wherein said first open-cell foamed layer having lower compressive resistance has a compressive resistance in terms of a compression load at 25% deflection of from about 10 to 300 g/cm².

4. A dam rubber as claimed in claim 2, wherein said second open-cell foamed layer having higher compressive resistance has a compressive resistance in terms of a compression load at 25% deflection of from about 40 to 800 g/cm².

5. A dam rubber as claimed in claim 1, wherein the thickness of said second open-cell foamed layer having higher compressive resistance is at least 50% of the total thickness of said layers.

6. A dam rubber as claimed in claim 1, wherein a sticking layer is provided at least one surface of said laminate.

7. A structure of an adhered window, comprising a supporting-frame, a window glass fitted thereto by use of an adhesive, and a dam rubber for a car window therebetween in a compressed state, said dam rubber having a spacer function and comprising a laminate of at least two open-cell foamed layers having different compressive resistances.

* * * * *